US007984937B2

(12) United States Patent
Tanimoto et al.

(10) Patent No.: US 7,984,937 B2

(45) Date of Patent: Jul. 26, 2011

(54) DOOR HANDLE APPARATUS FOR A VEHICLE

(75) Inventors: Tetsurou Tanimoto, Anjo (JP); Koichi Nagata, Chiryu (JP); Eiji Mushiake, Chita-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 960 days.

(21) Appl. No.: 11/711,014

(22) Filed: Feb. 27, 2007

(65) Prior Publication Data

US 2007/0216174 A1 Sep. 20, 2007

(30) Foreign Application Priority Data

Mar. 15, 2006 (JP) ................................ 2006-070558

(51) Int. Cl.
*E05B 3/00* (2006.01)
*G06F 7/00* (2006.01)

(52) U.S. Cl. .................................... 292/336.3; 340/5.72

(58) Field of Classification Search ............... 292/336.3; 340/5.72

See application file for complete search history.

(56) References Cited

U.S. PATENT DOCUMENTS 6,075,294 A * 6/2000 Van den Boom et al. .... 307/10.1
6,657,537 B1 * 12/2003 Hauler .......................... 340/5.62
6,768,413 B1 * 7/2004 Kemmann et al. ........... 340/5.72
7,091,823 B2 * 8/2006 Ieda et al. ..................... 340/5.72
7,126,453 B2 * 10/2006 Sandau et al. ............... 340/5.61
7,140,653 B2 * 11/2006 Kobayashi et al. ........... 292/348
7,375,299 B1 * 5/2008 Pudney ....................... 200/61.62
7,445,257 B2 * 11/2008 Muller et al. .............. 292/336.3
2005/0219043 A1 * 10/2005 Pollmann et al. ......... 340/426.28
2005/0236846 A1 * 10/2005 Hidaka et al. .................. 292/216
2007/0001467 A1 * 1/2007 Muller et al. .............. 292/336.3
2007/0182166 A1 8/2007 Schindler
2007/0216175 A1 * 9/2007 Tanimoto et al. .......... 292/336.3
2008/0061933 A1 * 3/2008 Ieda et al. .................... 340/5.72
2008/0314097 A1 * 12/2008 Rohlfing et al. ................ 70/256

FOREIGN PATENT DOCUMENTS

DE 103 48 719 A1 5/2005
EP 1 465 119 A1 10/2004
EP 1 510 637 A1 3/2005
JP 2002-295094 A 10/2002
JP 2003221947 A * 8/2003
JP 3502848 B2 12/2003
WO WO 03/095776 A1 11/2003
WO WO 2005/116376 A1 12/2005

OTHER PUBLICATIONS

Extended European Search Report for EP 07 10 3147 dated Oct. 26, 2007.

* cited by examiner

*Primary Examiner* — Carlos Lugo

(74) *Attorney, Agent, or Firm* — Buchanan Ingersoll & Rooney PC

(57) ABSTRACT

A door handle apparatus for a vehicle includes a door handle including an outer side handle portion formed with a grip portion, a rotating portion rotatably supported by a supporting member, an operating portion operating a door opening and closing mechanism, and an encasement accommodating electronic components, an unlock electrode accommodated in the encasement and configuring an unlock capacitive sensor detecting changes of an electric capacity between the unlock electrode and the outer panel, an unlock signal circuit transmitting an unlock signal based on the changes of the electric capacity between the unlock electrode and the outer panel, and a lock electrode provided between an end of the grip portion at the side of the rotating portion and the rotating portion and configuring a lock capacitive sensor detecting the changes of the electric capacity.

18 Claims, 8 Drawing Sheets

DOOR HANDLE APPARATUS FOR A VEHICLE

CROSS REFERENCE TO RELATED APPLICATIONS

This application is based on and claims priority under 35 U.S.C §119 with respect to Japanese Patent Application 2006-070558, filed on Mar. 15, 2006, the entire content of which is incorporated herein by reference.

FIELD OF THE INVENTION

This invention relates to a door handle apparatus for a vehicle performing opening and closing operations.

BACKGROUND

Conventionally, a user of a vehicle carries a portable unit of radio transmission and comes close to or moves away from the vehicle, a so-called smart entry system is used to transmit signals for locking or unlocking a door for the vehicle. The system has an on-board equipment which is attached to the vehicle. The on-board equipment transmits an electromagnetic wave (request signal) for requesting transmission to an outside of the vehicle and receives the electromagnetic wave sent back from a portable unit. The portable unit is meant to send back the electromagnetic wave which has a predetermined code to the on-board equipment in response to a receipt of the electromagnetic wave for requesting transmission from the on-board equipment. Then, the on-board equipment determines if the code of the electromagnetic, which is sent back, is identical to a specific code, and if the code is identical to the specific code, the system prepares for locking or unlocking the door. Consequently, if the user of the vehicle performs an operation, for example, for confirming the unlocking operation, the system transmits an unlock signal to bring an opening and closing mechanism of the door into an unlock state.

The system for confirming the door locking or unlocking operation is disclosed in JP3502848B (Page 5, FIGS. 1 and 2). In a grip portion of an operational handle disposed in an outer surface of an outer panel of a door, an unlock censor is disposed in a portion that a user's hand can be inserted between the grip portion and the outer panel and is located between the grip portion and the outer panel. A lock sensor is disposed in an end portion of the grip portion where are spaced away from the unlock sensor in a longitudinal direction of the grip portion.

However, as shown in FIG. 1 of JP3502848B, the lock sensor is disposed on a side of a guide arm which is located opposite to a supporting arm in a known system. Therefore, when the user of the vehicle inserts between the grip portion and the outer panel for the unlock operation and perform the operation, the use's hand is likely to be in contact with a detection range of the lock sensor, for example, by thumb. In this case, an unlocking instruction by the unlock sensor and a locking instruction by the lock sensor is performed at the same time and a proper signal may not be transmitted to a control device of a door lock. Further, the operation, which the user does not intend, may be performed. For example, when the door is open, the user's hand comes in contact the detection range of the lock sensor and the locking operation is performed.

The present invention has been made in view of the above circumstances, and provides a door handle apparatus for a vehicle reflecting the user's locking or unlocking intention.

SUMMARY OF THE INVENTION

According to an aspect of the present invention, a door handle apparatus for a vehicle includes a door handle including an outer side handle portion provided at an outer surface of an outer panel of a door of the vehicle and formed with a grip portion with a space relative to the outer surface of the outer panel, a rotating portion extending from an end of the outer side handle portion into an inside of the door by penetrating the outer panel and rotatably supported by a supporting member fixed to an inner surface of the outer panel, an operating portion extending from the other end of the outer side handle portion into the inside of the door by penetrating the outer panel, the operating portion operating a door opening and closing mechanism, and an encasement facing the outer panel and accommodating electronic components, an unlock electrode accommodated in the encasement and configuring an unlock capacitive sensor detecting changes of an electric capacity between the unlock electrode and the outer panel, an unlock signal circuit transmitting an unlock signal based on the changes of the electric capacity between the unlock electrode and the outer panel, and a lock electrode provided between an end of the grip portion at the side of the rotating portion and the rotating portion and configuring a lock capacitive sensor detecting the changes of the electric capacity.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described below with reference to the attached drawings.

Figure 1:
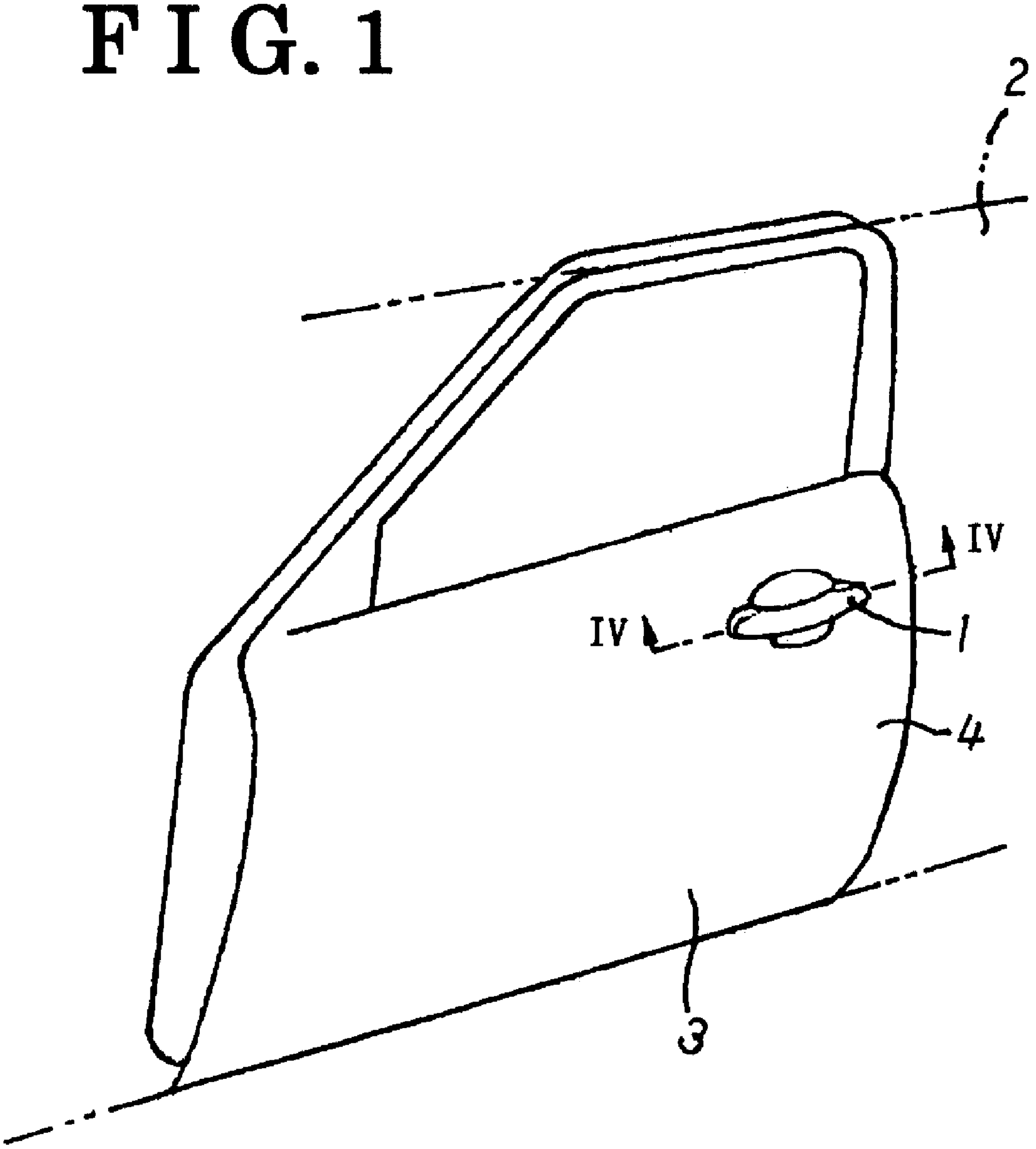
FIG. 1 is a perspective view illustrating a door, to which a door handle for a vehicle is attached, according to an embodiment of the invention.

FIG. 1 is a perspective view showing a door 3 of a vehicle 2, to which a door handle 1 for a vehicle according to a first embodiment of the invention is attached. In the figure, the grip type door handle 1 is attached to a metal outer panel 4 projecting outwardly from the outer panel 4 in a vehicle width direction. The door handle 1 is operated for opening and closing the door 3 and is a substantially curved hollow structure. One end of the door handle 1 is rotatably supported by the outer panel 4. An operating portion, which operates a door closing and opening mechanism (not shown), is inserted into an inner portion of the door 3 penetrating the outer panel 4. The door 3 shown in FIG. 1 is a side door of the vehicle 2, however, the door handle 1 may be attached to a back door.

Figure 2:
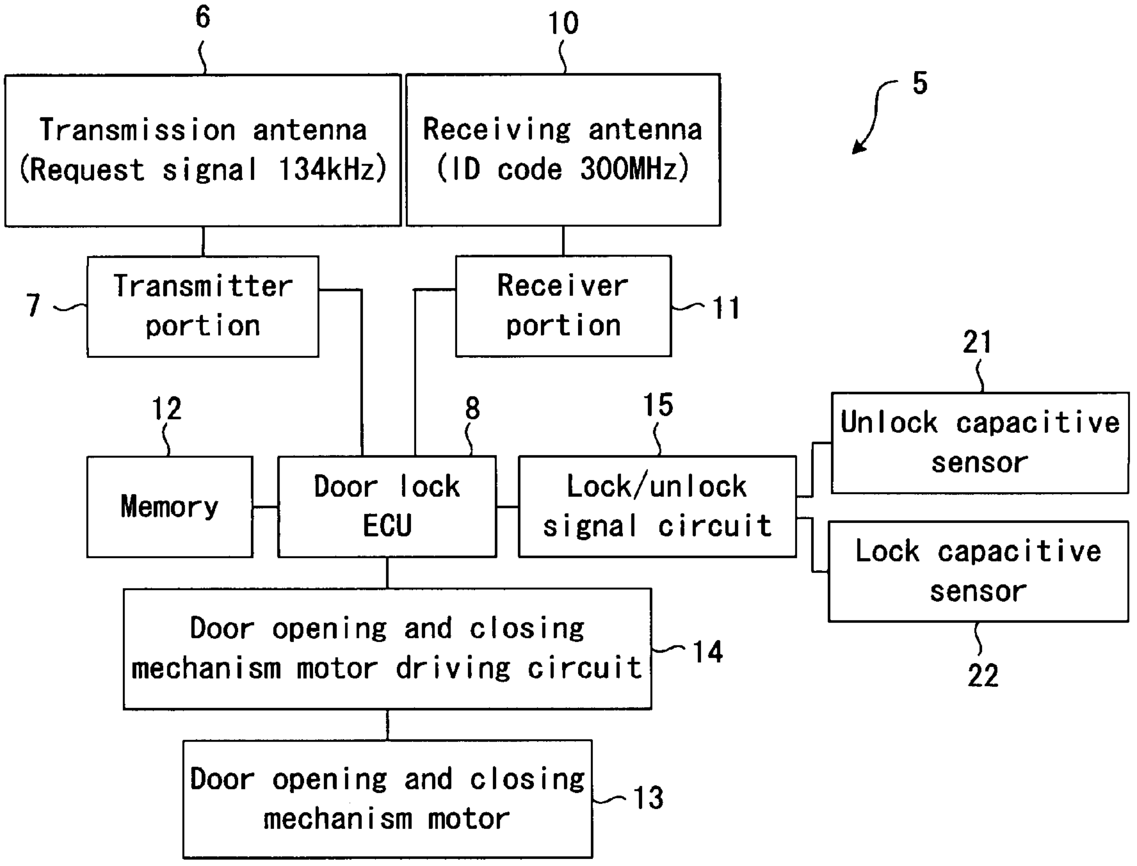
FIG. 2 is a block diagram illustrating an example of an on-board equipment of a door handle apparatus for the vehicle.

FIG. 2 is a block diagram illustrating an example of an on-board equipment 5 of a smart entry system serving as a door handle apparatus for a vehicle using the door handle 1. In the figure, the on-board equipment 5 has a transmission antenna 6 incorporated in the door handle 1. The transmission antenna 6 is connected to a transmitter portion 7. The transmitter potion 7 is attached to a frame which is located near the door 3 of the vehicle 2 and is connected to a door lock ECU 8.

The door lock ECU 8 supplies a request code to the transmitter portion 7 and a request signal having a frequency, which is modulation of the request code, for example, 134 kHz is transmitted from the transmission antenna 6 to a portable unit 9. Moreover, a receiving antenna 10 is incorporated, for example, in an inner mirror located in a vehicle cabin in the vehicle 2 and a signal, such as a signal having a 300 MHz frequency, transmitted from the portable unit 9 is received by the receiving antenna 10. Then the signal is to be input to the door lock ECU 8 after being demodulated in a receiver portion 11. A memory 12 is connected to the door lock ECU8, and several different codes such as a request code, a transponder ID code, and the likes are stored. The memory 12 is a nonvolatile memory such as an EEPROM and the likes. Even if the power is disconnected, the storage is retained.

A motor driving circuit 14 is connected to the door lock ECU 8 and drives a motor 13 provided at the door opening and closing mechanism. Once a lock signal or an unlock signal is input from the lock and unlock signal circuit 15, the door lock ECU 8 outputs a signal for the motor 13 to rotate in a normal direction or a reverse direction. Consequently, the door closing and opening mechanism comes into a lock state or an unlock state. The lock and unlock signal circuit 15 has a lock signal circuit and an unlock signal circuit and an unlock capacitive sensor 21 and a lock capacitive sensor 22 are connected to the lock and unlock signal circuit 15. The capacitive sensors 21 and 22 are provided at the door handle 1.

Figure 3:
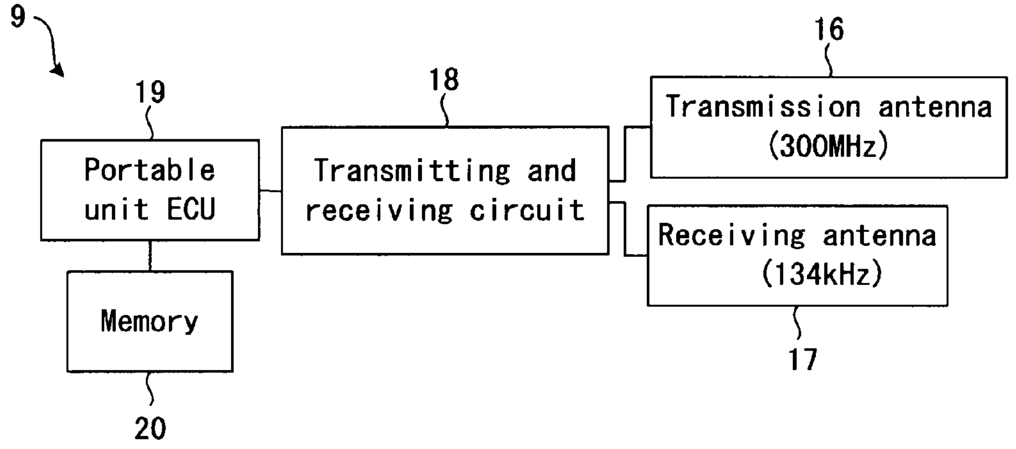
FIG. 3 is a block diagram illustrating an example of a portable unit of the door handle apparatus for the vehicle.

FIG. 3 is a block diagram illustrating an example of the portable unit 9 of a smart entry system using the door handle 1. The portable unit 9 has a transmission antenna 16 and a receiving antenna 17. The antennas 16 and 17 are connected to a transmitting and receiving circuit 18 and the transmitting and receiving circuit 18 is connected to a portable unit ECU 19. The request signal having the frequency, which is transmitted from the on-board equipment 5, for example, 134 kHz is received by the receiving antenna 17 and is input to the portable unit ECU 19 after being demodulated in the transmitting and receiving circuit 18. Furthermore, the portable unit ECU 19 supplies a transponder ID code, which is read from the memory 20, to the transmitting and receiving circuit 18. The transponder ID code is modulated in the transmitting and receiving circuit 18. The signal having the frequency, for example, 300 MHz, is transmitted from the transmission antenna 16 to the on-board equipment 5.

The 134 kHz frequency request signal is constantly transmitted from the transmission antenna 6 of the on-board equipment 5 of the smart entry system. When the portable unit 9 receives the request signal, then the portable unit 9 sends back the 300 MHz frequency signal, which is a modulated signal of the transponder ID code. The 300 MHz frequency signal received from the receiving antenna 10 of the on-board equipment 5 is demodulated in the receiver portion 11 to be input to the door lock ECU8. The door lock ECU 8 receives the transponder ID code and checks the ID code against the ID code stored in the memory. If the ID codes match, the door lock ECU 8 activates the lock and unlock signal circuit 15. While the lock and unlock signal circuit 15 is in operation, a user's hand comes close to or comes in contact with the unlock capacitive sensor 21 or a lock capacitive sensor 22 of the door handle 1, then the lock and unlock signal circuit 15 outputs the unlock signal or the lock signal. Consequently, the door lock ECU 8 brings the door opening and closing mechanism into the lock state or the unlock state based on either one of the unlock and lock signals.

Figure 4:
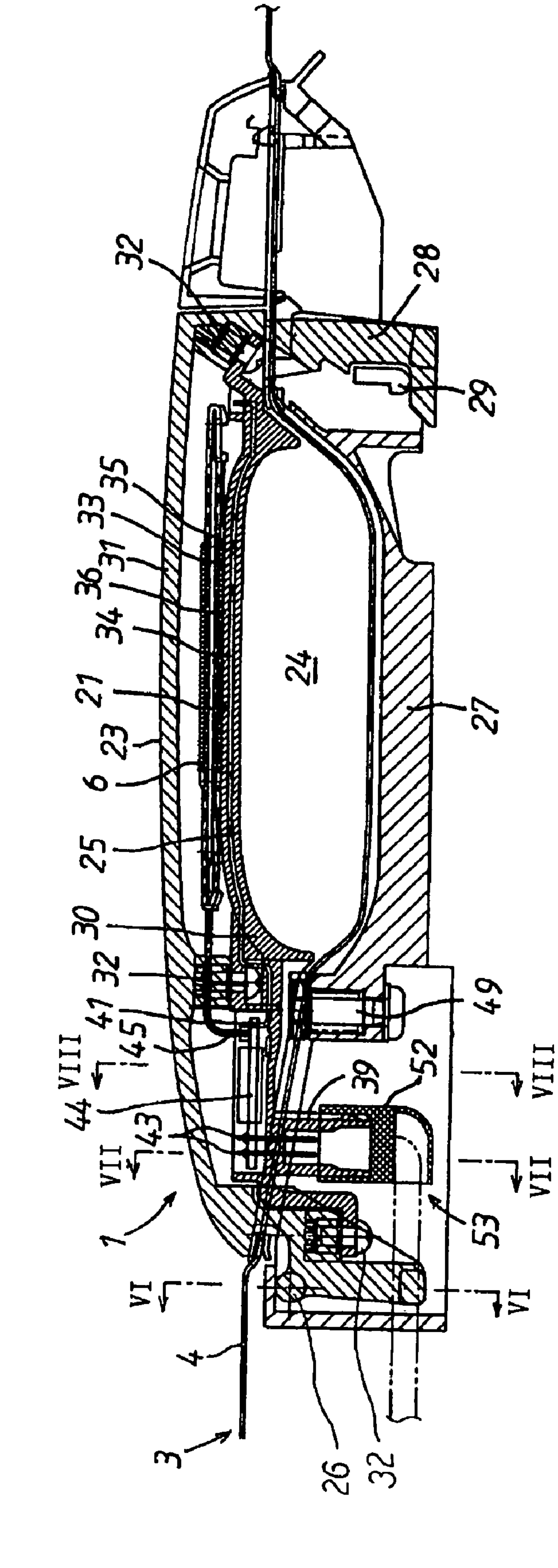
FIG. 4 is an enlarged sectional view of the door handle apparatus according to the first embodiment viewed from a direction of a line IV-IV of FIG. 1.
Figure 6:
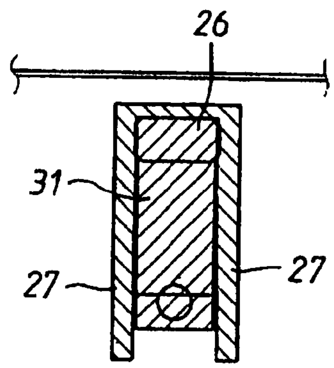
FIG. 6 is a sectional view taken along a line VI-VI of FIG. 4.

FIG. 4 is an enlarged sectional view of the door handle 1 taken along a line IV-IV of FIG. 1. The door handle 1 has an outer side handle portion 23 located an outer side of the outer panel 4 of the door 3 of the vehicle 2 in the vehicle width direction. A grip portion 25 is formed at the outer side handle portion 23 defining a space 24 between the door handle 1 and the outer panel 4. A rotating portion 26 extends to an inside of the door 3 from an end of the outer side handle portion 23 penetrating the outer panel 4 and is rotatably supported by a supporting member 27 fixed at an inside of the outer panel 4 by way of a screw 49 (refer to FIG. 6). An operating portion 28 extends to an inside of the door 3 penetrating the outer panel 4 at another end of the outer side handle portion 23 and operates a lever 29 of the door opening and closing mechanism.

The door handle 1 is configured by an incorporation of a first handle member 30 and a second handle member 31 by way of a screw 32 so that the first handle member 30, which is made of resin, closes an elongated recessed portion of the second handle member 31 from the door panel 4 side. An encasement 33 is formed so as to face the outer panel 4 in the first handle member and electronic components are accommodated in the encasement 33. The second handle member 31 covers the encasement 33 and is engaged with the first handle member 30 and the rotating portion 26 and the operating portion 28 are formed in the second handle member 31. The outer surface of the second handle member 31 is painted for appearance improvement.

Figure 5:
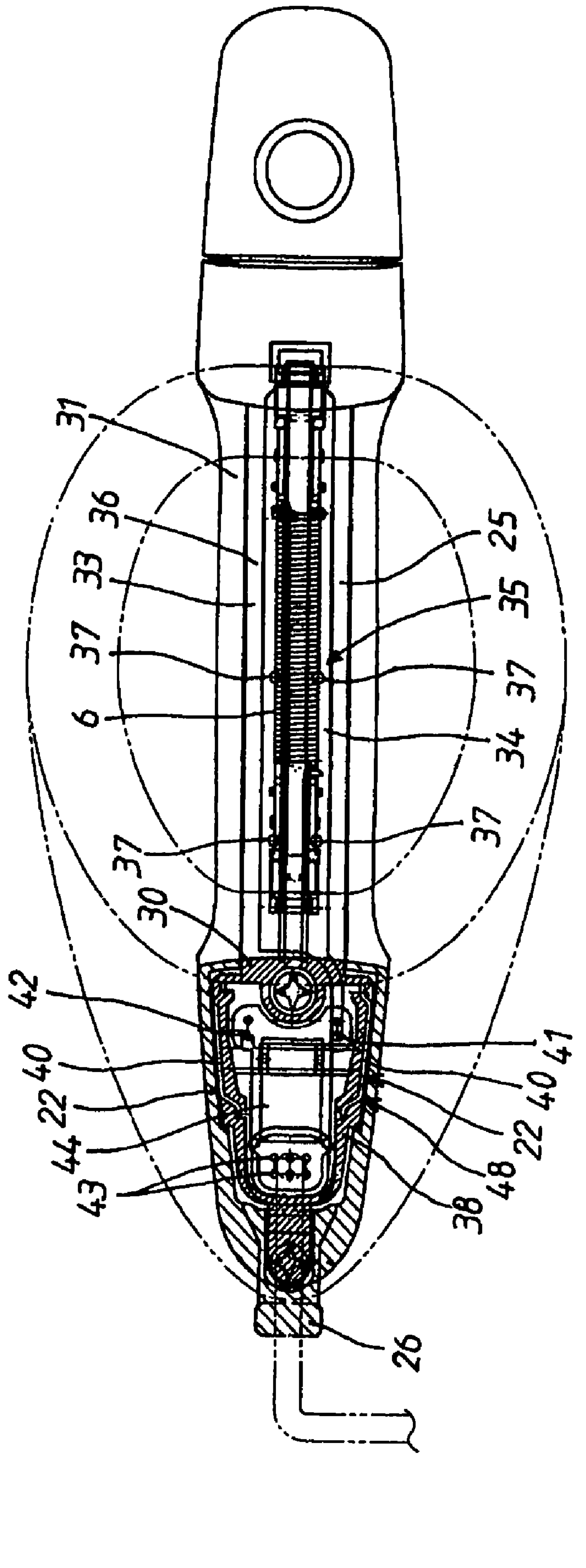
FIG. 5 is a plain view illustrating a cross sectional surface of a part of the door handle apparatus according to the first embodiment.

An unlock electrode 34 of the unlock capacitive sensor 21 and the transmission antenna 6 ate accommodated in the encasement as electronic components. A ferrite bar is accommodated in a resin case and the case is winded with a coil to form the transmission antenna 6. A holding portion 35 is formed in the encasement 33 of the first handle member 30 and the holding portion 35 holds the unlock electrode 34 and the transmission antenna 6. Namely, the first handle member 30 is insert molded with the unlock electrode 34 inserted into a bottom wall 36 of the encasement 33, which faces the outer panel 4. The bottom wall portion where the unlock electrode 34 is insert molded to the first handle member 30 is an example of the holding portion 35 which holds the unlock electrode 34 in the encasement 33. As illustrated in FIG. 5, a plurality of columnar protrusions 37 are projected along both sides of the transmission antenna 6 at a bottom surface, which is a part of the bottom wall 36 of the encasement 33, to hold the transmission antenna 6 in the encasement 33. The bottom surface is positioned at an outer side of the unlock electrode

34 in the vehicle width direction. An engaging portion is formed at a distal end of each columnar protrusion 37. The columnar protrusions 37 sandwich the transmission antenna 6 at both sides of the transmission antenna 6 with the columns and hold the transmission antenna 6 in the encasement 33 by engaging an upper surface of the transmission antenna 6 with the engaging portions. These columnar protrusions 37 are one of examples of the holding portion 35, which holds the transmission antenna 6 in the encasement 33.

As described above, the unlock electrode 34 of the unlock capacitive sensor 21, which detects the electric capacity between the unlock electrode 34 and the outer panel 4, is accommodated in the portion where is closer to the outer panel 4 relative to the transmission antenna 6 of the encasement 33 and be held to the bottom wall 36 by insert molding. The unlock signal circuit of the lock and unlocking signal circuit 15 detects changes of the electric capacity between the unlock electrode 34 and the outer panel 4 to transmit the door unlock signal.

Figure 7:
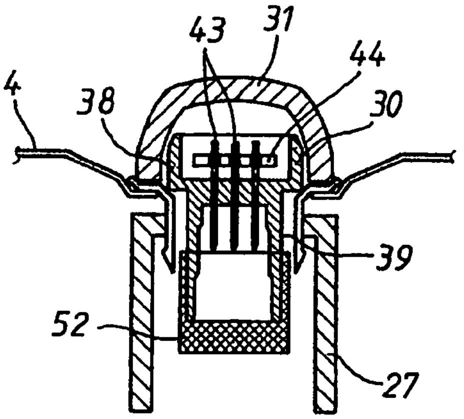
FIG. 7 is a sectional view taken along a line VII-VII of FIG. 4.

As illustrated in FIGS. 4 and 5, a substrate encasement 38 is formed in the door handle. More specifically, the substrate encasement 38 is formed between the rotating portion 26 and the end portion of the grip portion 25 at the side of the rotating portion. A connector 39 is projected from a bottom wall of the substrate encasement 38 in the vehicle width direction and penetrates the outer panel 4 to extend between both side walls of the supporting member 27 in the door 3. (refer to FIG. 7)

A lock electrode 40 of the lock capacitive sensor 22, which detects the electric capacity or the changes of the electric capacity between the lock electrode 40 and the outer panel 4, is inserted into both side walls of the substrate encasement 38 (upper and lower sides of the outer side handle portion 23) by insert molding. Parts of the lock electrode 40, which are inserted into the both side walls, are connected at one point on the bottom surface of the substrate encasement 38 (refer to FIG. 8). As described above, it is possible to decrease man-hours for assembly by inserting the lock electrode 40 into both side walls of the substrate encasement 38 by insert molding. The lock electrode 40 is configured to be inserted into both side walls of the substrate encasement 38 by insert molding. However, the lock electrode 40 may be assembled after molding the first door handle member 30. In this case, it is still possible to hold the lock electrode 40 so as to be covered in the resin first handle member 30. Thus, it is possible to improve waterproof property of the lock electrode 40.

Figure 8:
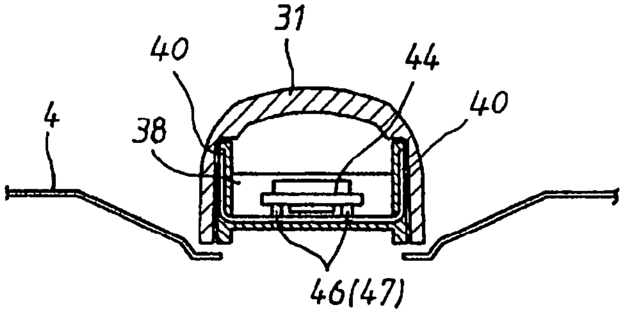
FIG. 8 is a sectional view taken along a line VIII-VIII of FIG. 4.

A terminal 41 of the unlock electrode 34, a terminal 42 of the lock electrode 40 and terminals 43 of the connector 39 are projected outwardly from the bottom wall of the substrate encasement 38 in the vehicle width direction. The lock and unlock signal circuit 15, which is connected to the unlock electrode 34 and the lock electrode 40, is mounted in the substrate 44. In order to hold the substrate 44 in the substrate encasement 38 in the condition that the substrate 44 is connected to the unlock electrode 34, the lock electrode 40 and the connector 39, as illustrated in FIG. 8, a plurality of engaging protrusions 46 are projected in a bottom surface of the substrate encasement 38. An engaging portion is formed on a distal end of each engaging protrusion. The engaging protrusions 46 holds the substrate 44 in the substrate encasement 38 by engaging the engaging holes of the substrate 44 with the engaging portions. The engaging protrusion 46 is an example of a substrate holding portion 47 which holds the substrate 44 in the substrate encasement 38.

Terminals of the substrate 44, which is accommodated in the substrate encasement 38 being held by the substrate holding portion 47, and the terminals 41, 42 and 43 of the unlock electrode 34, the lock electrode 40, and the connector 39 are connected and soldered. The substrate encasement 38 is covered by the second handle member 31 with both walls of the substrate encasement 38 being in contact with inner sides of both side walls of the second handle member 31 after the substrate 44 is accommodated, and the first and second handle members 30 and 31 are connected by fastening with a screw 32. A connector 52 of a wire harness 53 is inserted to the connector 39 and the wire harness 33 is connected to the transmitter portion 7.

Operation of the first embodiment, which is configured as described above, will be described below. In the case that the user of the vehicle operates the door handle 1 to unlock the door 3, when the user inserts its hand into the space 24 defined between the outer panel 4 and the door handle 1 to hold the grip portion 25, the user's hand does not come close to or come in contact with the detection range of the lock electrode 40. Thus, the lock and unlock signal circuit 15 can detect the changes of the electricity capacity formed between the unlock electrode 34 and the outer panel 4 to properly output the door unlock signal. Additionally, only a part of the bottom wall 36 of the encasement 33 of the first handle member 30 is interposed between the unlock electrode 34 and the outer panel 4 of the door 3 of the vehicle 2. Hence, when the user's hand is inserted between the door handle 1 and the outer panel 4, the electricity capacity adequately changes between the unlock electrode 34 and the outer panel 4 and it is possible to unfailingly detect that the approach or the contact to the door handle 1 without any malfunction.

In the case that the user of the vehicle operates the door handle 1 to lock the door 3, the user can easily put its hand close to or contact with one end of both side walls of the substrate encasement 38 (upper and lower side portions of the outer side handle portion 23), where the lock electrode 40 is provided. Consequently, the lock and unlock signal circuit 15 detects the changes of the electric capacity formed between the lock electrode 40 and the outer panel 4 to properly output the door lock signal. Hence, the lock and unlock signal circuit 15 does not output the conflicting signals. In other words, the lock and unlock signal circuit 15 does not output the unlock signal and the lock signal at the same time. Therefore, it is possible to bring the door opening and closing mechanism into the lock state or the unlock state adequately reflecting the user's locking or unlocking intention.

The lock electrode 40 is provided at both side walls of the substrate encasement 38 (upper and lower side portions of the outer side handle portion 23). However, the position of the lock electrode 40 is not limited to the above. The lock electrode 40 may be provided at one side of both side walls of the substrate encasement 38.

Further, as described in the first embodiment, if the unlock capacitive sensor 21 is provided to transmit the unlock signal and a lock signal transmitting device 48 is provided to transmit the door lock signal at the door handle 1, it is possible to individually confirm the door locking intention and the door unlocking intention to lock or unlock the door without fail.

Furthermore, when the resin first handle member 30 is insert molded with the lock electrode 40 inserted thereinto to hold the lock electrode 40 in both side walls of the substrate encasement 38, it is possible to uniformly mold a resin layer, which is interposed between the lock electrode 40 and the outer panel 4 of the door 3 of the vehicle 2, at a predetermined thickness. Therefore, it is possible to reduce variations in the detection range of the lock capacitive sensor 22.

Next, a second embodiment of the door handle 1 for a vehicle of this invention will be described. A metal plating processing is performed on the outer surface of the second handle member 31 in the second embodiment, while a paint processing is performed on the outer surface of the second handle member 31 in the first embodiment. Thus, the configuration of the lock capacitive sensor 21 of the second embodiment is different from that of the first embodiment. Only different configurations will be described below. Identical reference numbers are assigned for the unchanged portions and the description is omitted.

The lock electrode 40 of the lock capacitive sensor 22 is inserted into both side walls of the substrate encasement 38 by insert molding. When both side walls of the substrate encasement 38 is covered by the second handle member 31 with both side wall of the substrate encasement 38 being in contact with inner sides of both side walls of the second handle member 3 1, the outer surface of the second handle member 31 is metal plated, and thus even if the user's hand comes close to or comes in contact with the lock capacitive sensor 22 of the lock door 1, the changes of the electric capacity formed between the lock electrode 40 and the outer panel 4 of the door 3 of the vehicle 2 is not detected due to a high dielectric constant of the metal plated portion.

Figure 9:
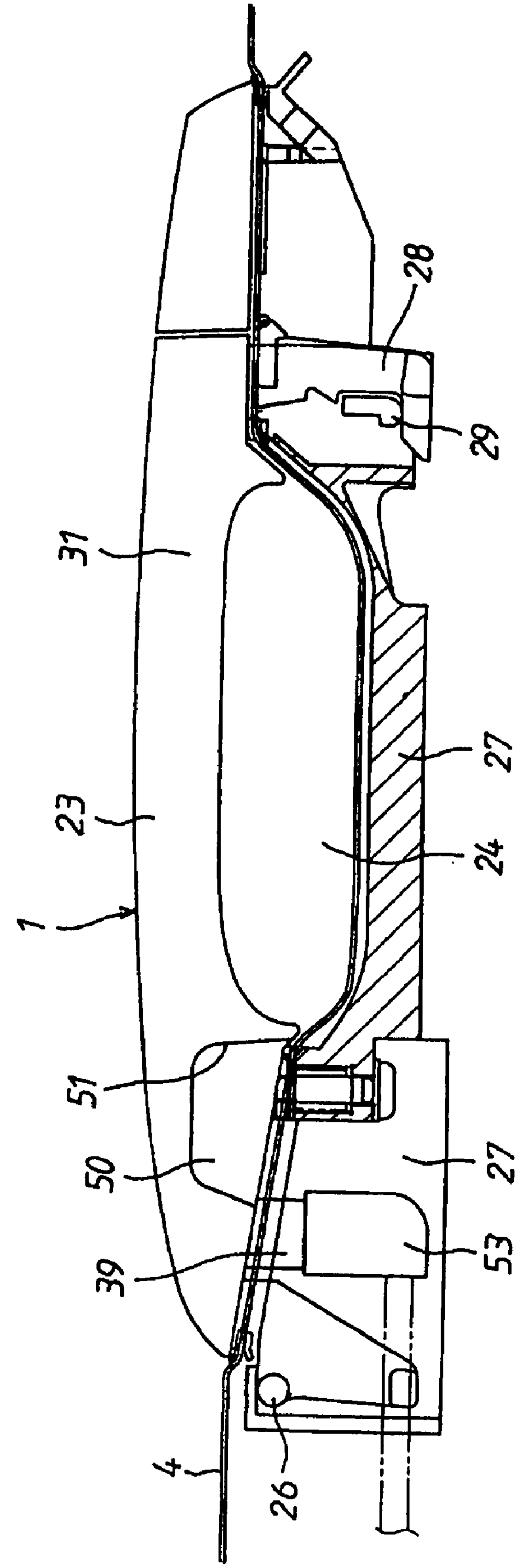
FIG. 9 is an enlarged sectional view of the door handle according to a second embodiment viewed from a direction of a line IV-IV of FIG. 1.
Figure 10:
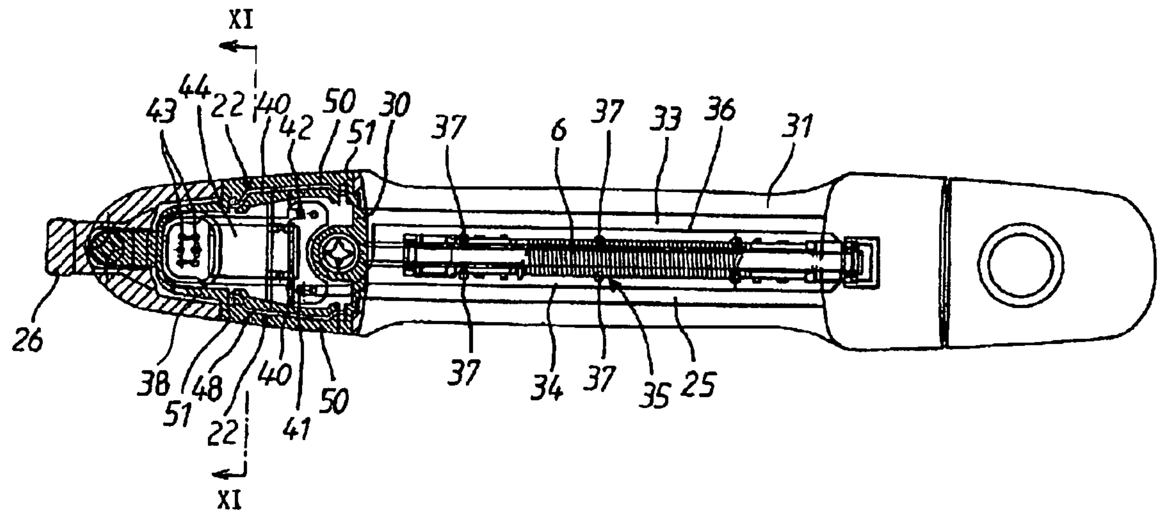
FIG. 10 is an elevation view of the door handle apparatus according to the second embodiment.
Figure 11:
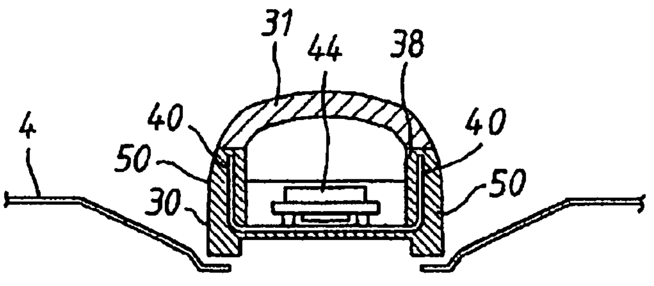
FIG. 11 is a sectional view taken along a line XI-XI of FIG. 10.
Figure 12:
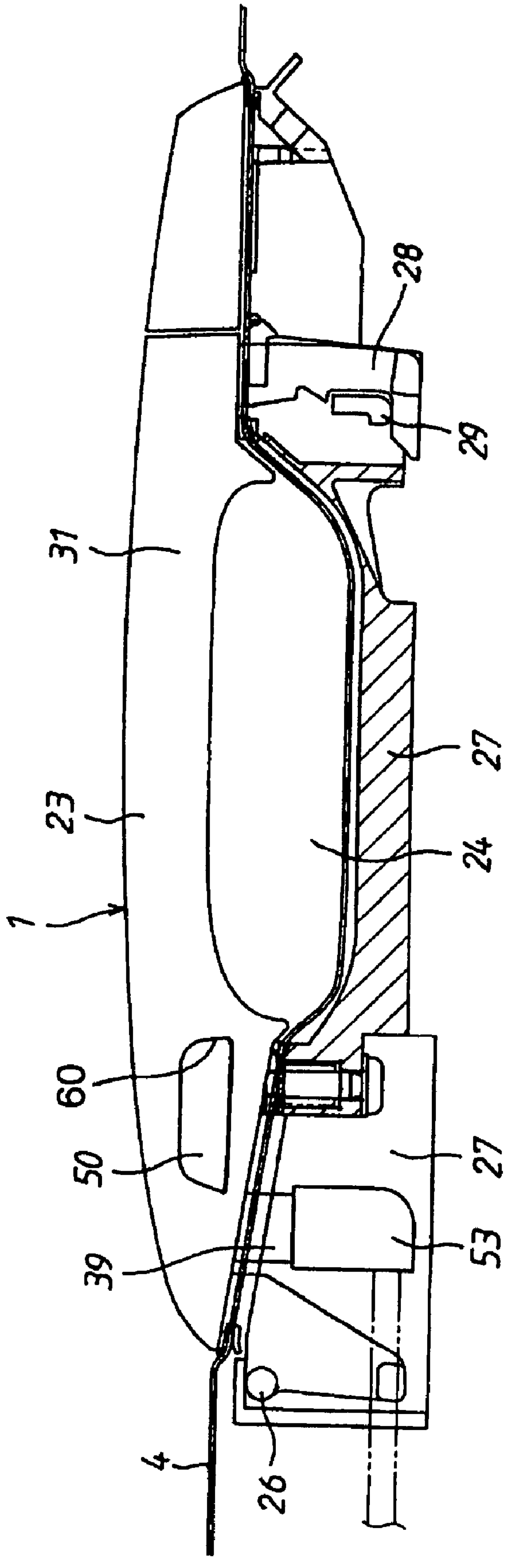
FIG. 12 is an enlarged sectional view of the door handle according to another embodiment viewed from the direction of a line IV-IV of FIG. 1.

Consequently, in the second embodiment, as illustrated in FIGS. 9 and 10, a portion where the lock electrode 40 of the substrate encasement 38 of the first handle member 30 is inserted by insert molding is extended to form a flared portion. Notches 51 are provided in the second handle member 3 1. Specifically, the notches 5 1 are provided at the portion facing the flared portion 50 (the metal plated portion which faces the lock electrode 40). When the first and second handle members 30 and 31 are integrated, the flared portion 50 is fitted into the notches 51 so that the outer surface of the flared portion 50 and the outer surface of the second handle member 31 become a single surface. In other words, a front surface of the lock electrode 40 is opened by providing the notches 51 in the metal plated portion. Therefore, if the use's hand comes close to or comes in contact with the detection range of the lock capacitive sensor 22 of the door handle 1, the lock signal circuit of the lock and unlock signal circuit 15 properly detects the changes of electric capacity formed between the lock electrode 40 and the outer panel 4 to output the door lock signal. In the second embodiment, the notches 51 are provided at the metal plating portion of the second handle member 31. However, the form is not limited to the notches, for example, as illustrated in FIG. 12, opening holes may be provided.

The above-mentioned configuration according to the embodiments of the invention, the lock electrode of the lock capacitive sensor is provided between the end portion of the grip portion at the side of the rotating portion and the rotating portion. Thus, when operating the handle to unlock the door, the user's hand holds the grip portion and is unlikely to come close to or come in contact with the lock electrode. Further, when operating the handle to lock the door, the user's hand can easily come close to or come in contact with the lock electrode positioned between the end portion of the grip portion at the side of the rotating portion and the rotating portion. For the reason, the conflicting operation, which is locking and unlocking the door at the same time, is not performed. Thus, it is possible to operate the door handle apparatus properly reflecting the user's locking or unlocking intention.

The above-mentioned configuration according to the embodiments of the invention, even if the user of the vehicle holds the door handle to unlock the door, the user's hand is unlikely to come close to or come in contact with the detection range of the lock electrode. When the user intend to lock the door, it is possible to easily come close to or come in contact with the detection range of the lock electrode to perform the lock operation.

The above-mentioned configuration according to the embodiments of the invention, the lock electrode is insert molded in the resin portion of the door handle or assembled after the first handle member is molded to be held. Therefore, it is possible to improve waterproof property and reduce man-hours for the assembly of components.

The above-mentioned configuration according to the embodiments of the invention, the second handle member is metal plated. If a front surface of the detection range of the lock electrode provided at the first handle member is covered by the metal plated second handle member, it is not possible to detect the changes of the electrical capacity between the lock electrode and the outer panel of the door of the vehicle due to a high dielectric constant of the metal plated portion. For the reason, the notches or the opening holes are provided in the metal plated portion to eliminate the influence of the metal plated portion on the lock electrode to properly detect the changes of the electric capacity caused by the contact or the approach of the user's hand.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A door handle apparatus for a vehicle, comprising:

a door handle mounted on an outer surface of an outer panel of a door of the vehicle, the door handle including:

an outer side handle portion and an inner side handle portion, the inner side handle portion having a grip portion, a space being formed between the outer surface of the outer panel and the grip portion;

a rotating portion extending from an end of the outer side handle portion into inside of the door by penetrating the outer panel and rotatably supported by a supporting member fixed to an inner surface of the outer panel;

an operating portion extending from the other end of the outer side handle portion into the inside of the door by penetrating the outer panel, the operating portion operating a door opening and closing mechanism;

an unlock electrode unit accommodated in a first encasement located between the outer and inner side handle portions, the unlock electrode unit including a first electrode, wherein the unlock electrode unit detects a first electric capacity between the first electrode and the outer panel when a user inserts his hand into the space between the grip portion and the outer surface of the outer panel, the first electric capacity being transmitted to a microprocessor on the door opening and closing mechanism to unlock the door; and a lock electrode unit accommodated in a second encasement located between the rotating portion and an end of the grip portion closest to the rotating portion considered with reference to a longitudinal direction of the vehicle, the lock electrode unit including a second electrode, wherein the lock electrode unit detects a second different electric capacity between the second electrode and the outer panel when the user places his hand close to or in contact with one or both sides of the second encasement, the second electric capacity being transmitted to the microprocessor on the door opening and closing mechanism to lock the door.

2. A door handle apparatus for a vehicle according to claim 1, wherein the lock electrode is provided on one of an upper side wall and a lower side wall of the outer side handle portion, which are positioned between the end of the grip portion at the side of the rotating portion and the rotating portion.

3. A door handle apparatus for a vehicle according to claim 1, wherein at least a part of the door handle is made of resin, and the lock electrode is inserted into the door handle by insert molding or be assembly conducted after the door handle is formed to be held by the door handle.

4. A door handle apparatus for a vehicle according to claim 2, wherein at least a part of the door handle is made of resin, and the lock electrode is inserted into the door handle and held by insert molding or be assembly conducted after the door handle is formed to be held by the door handle.

5. A door handle apparatus for a vehicle according to claim 1, wherein the inner side handle portion is made of resin and formed with the first encasement; and the outer side handle portion which surface is metal plated and covering the first encasement and being engaged with the inner side handle portion, wherein a front side of the lock electrode is opened by providing a notch or an opening hole at a metal plated portion of the outer side handle portion.

6. A door handle apparatus for a vehicle according to claim 2, wherein the inner side handle portion is made of resin and formed with the first encasement; and the outer side handle portion which surface is metal plated and covering the first encasement and being engaged with the inner side handle portion, wherein a front side of the lock electrode is opened by providing a notch or an opening hole at a metal plated portion of the outer side handle portion.

7. A door handle apparatus for a vehicle according to claim 3, wherein the inner side handle portion is made of resin and formed with the first encasement; and the outer side handle portion which surface is metal plated and covering the first encasement and being engaged with the inner side handle portion, wherein a front side of the lock electrode is opened by providing a notch or an opening hole at a metal plated portion of the outer side handle portion.

8. A door handle apparatus for a vehicle according to claim 1, wherein the inner side handle portion is made of resin and formed with the first encasement; and the outer side handle portion which surface is metal plated and covering the first encasement and being engaged with the inner side handle portion, wherein a notch or an opening is provided at a portion which faces the lock electrode in the metal plated portion.

9. A door handle apparatus for a vehicle according to claim 2, wherein the inner side handle portion is made of resin and formed with the first encasement; and the outer side handle portion which surface is metal plated and covering the first encasement and being engaged with the inner side handle portion, wherein a notch or an opening is provided at a portion which faces the lock electrode in the metal plated portion.

10. A door handle apparatus for a vehicle according to claim 3, wherein the inner side handle portion is made of resin and formed with the first encasement; and the outer side handle portion which surface is metal plated and covering the first encasement and being engaged with the inner side handle portion, wherein a notch or an opening is provided at a portion which faces the lock electrode in the metal plated portion.

11. A door handle apparatus for a vehicle, comprising:

a door handle mounted on an outer surface of an outer panel of a door of the vehicle, the door handle including:

an outer side handle portion and an inner side handle portion, the inner side handle portion having a grip portion, a space being formed between the outer surface of the outer panel and the grip portion;

a rotating portion extending from an end of the outer side handle portion into inside of the door by penetrating the outer panel and rotatably supported by a supporting member fixed to an inner surface of the outer panel;

an operating portion extending from the other end of the outer side handle portion into the inside of the door by penetrating the outer panel, the operating portion operating a door opening and closing mechanism;

an unlock electrode unit accommodated in a first encasement located between the outer and inner side handle portion, the unlock electrode unit including a first electrode, wherein the unlock electrode unit detects changes of a first electric capacity between the first electrode and the outer panel when a user inserts his hand into the space between the grip portion and the outer surface of the outer panel, changes of the first electric capacity being transmitted to a microprocessor on the door opening and closing mechanism to unlock the door; and a lock electrode unit accommodated in a second encasement between the rotating portion and an end of the grip portion closest to the rotating portion considered with reference to a longitudinal direction of the vehicle, the lock electrode unit including a second electrode, wherein the lock electrode unit detects changes of a second different electric capacity between the second electrode and the outer panel when the user places his hand close to or in contact with one or both sides of the second encasement, changes of the second electric capacity being transmitted to the microprocessor on the door opening and closing mechanism to lock the door.

12. A door handle apparatus for a vehicle, comprising:

a door handle mounted on an outer surface of an outer panel of a door of the vehicle and including an outer side handle portion and an inner side handle portion, the inner side handle portion having a grip portion, a space being provided between the outer surface of the outer panel and the grip portion, the outer side handle portion having lengthwise opposite first and second end portions between which the grip portion is positioned;

a rotating portion extending from the first end portion of the outer side handle portion into inside of the door by penetrating the outer panel and rotatably supported by a supporting member fixed to an inner surface of the outer panel;

an operating portion extending from the second end portion of the outer side handle portion into the inside of the door by penetrating the outer panel, the operating portion operating a door opening and closing mechanism;

an unlock electrode unit accommodated in a first encasement located between the outer and inner side handle portion, the unlock electrode unit including a first electrode, wherein the unlock electrode unit detects a first electric capacity between the first electrode and the outer panel when a user inserts his hand into the space between the grip portion and the outer surface of the outer panel, the first electric capacity being transmitted to a microprocessor on the door opening and closing mechanism to unlock the door;

a lock electrode unit accommodated in a second encasement provided at the first end portion of the outer side handle portion, the lock electrode unit including a second electrode, wherein the lock electrode unit detects a second different electric capacity between the second electrode and the outer panel when the user places his hand close to or in contact with one or both sides of the second encasement, the second electric capacity being transmitted to the microprocessor on the door opening and closing mechanism to lock the door.

13. A door handle apparatus for a vehicle according to claim 12, wherein the lock electrode is provided on one of an upper side wall and a lower side wall of the outer side handle portion, which are positioned between the end of the grip portion at the side of the rotating portion and the rotating portion.

14. A door handle apparatus for a vehicle according to claim 12, wherein at least a part of the door handle is made of resin, and the lock electrode is inserted into the door handle by insert molding or be assembly conducted after the door handle is formed to be held by the door handle.

15. A door handle apparatus for a vehicle according to claim 13, wherein at least a part of the door handle is made of resin, and the lock electrode is inserted into the door handle and held by insert molding or be assembly conducted after the door handle is formed to be held by the door handle.

16. A door handle apparatus for a vehicle according to claim 12, wherein the inner side handle portion is made of resin and formed with the first encasement; and the outer side handle portion which surface is metal plated and covering the first encasement and being engaged with the inner side handle portion, wherein a front side of the lock electrode is opened by providing a notch or an opening hole at a metal plated portion of the outer side handle portion.

17. A door handle apparatus for a vehicle according to claim 1, further comprising a lock signal circuit transmitting an lock signal based on the electric capacity between the lock electrode and the outer panel.

18. A door handle apparatus for a vehicle according to claim 1, wherein said unlock electrode is positioned relative to the space formed by said grip portion such that, when a user's hand is inserted into the space to hold the grip portion, said unlock signal circuit transmits the unlock signal based on a change in the electric capacity between the unlock electrode and the outer panel.

* * * * *